(12) United States Patent
Scudder et al.

(10) Patent No.: US 7,869,345 B2
(45) Date of Patent: *Jan. 11, 2011

(54) LOOP PREVENTION TECHNIQUES USING ENCAPSULATION MANIPULATION OF IP/MPLS FIELD

(75) Inventors: John Galen Scudder, Ann Arbor, MI (US); David D. Ward, Los Gatos, CA (US); Clarence Filsfils, Brussels (BE)

(73) Assignee: Cisco Technology, Inc., San Jose, CA (US)

( * ) Notice: Subject to any disclaimer, the term of this patent is extended or adjusted under 35 U.S.C. 154(b) by 52 days.

This patent is subject to a terminal disclaimer.

(21) Appl. No.: 12/348,766

(22) Filed: Jan. 5, 2009

(65) Prior Publication Data

US 2009/0147674 A1    Jun. 11, 2009

Related U.S. Application Data

(63) Continuation of application No. 11/098,173, filed on Apr. 4, 2005, now Pat. No. 7,477,593.

(51) Int. Cl.
*H04L 12/56* (2006.01)

(52) U.S. Cl. .................. 370/217; 370/221; 370/225; 370/242

(58) Field of Classification Search .................. 370/216, 370/217, 221, 225
See application file for complete search history.

(56) References Cited

U.S. PATENT DOCUMENTS

| | | | |
|---|---|---|---|
| 6,339,595 B1 | 1/2002 | Rekhter et al. | |
| 6,665,273 B1 | 12/2003 | Goguen et al. | |
| 6,778,492 B2 | 8/2004 | Charny et al. | |
| 6,813,242 B1 | 11/2004 | Haskin et al. | |
| 7,180,866 B1 | 2/2007 | Chartre et al. | |
| 7,535,828 B2 * | 5/2009 | Raszuk et al. | 370/219 |
| 7,633,859 B2 * | 12/2009 | Filsfils et al. | 370/225 |
| 2002/0060985 A1 | 5/2002 | Lee et al. | |
| 2002/0112072 A1 | 8/2002 | Jain | |
| 2003/0028818 A1 | 2/2003 | Fujita | |
| 2003/0229807 A1 | 12/2003 | Qiao et al. | |

(Continued)

OTHER PUBLICATIONS

Andrew S. Tanenbaum, "Computer Networks", Fourth Edition, Section 1.4.2 pp. 41-44, Pearson Education 2003.

(Continued)

*Primary Examiner*—Albert T Chou
(74) *Attorney, Agent, or Firm*—Cesari and McKenna, LLP

(57) ABSTRACT

In one embodiment, an edge device communicates with a neighboring routing domain. A failure that prevents communication between the edge device and the neighboring routing is detected. When the edge device thereafter receives a data packet that is directed to the neighboring routing domain, it determines if the received data packet was rerouted to the edge device from another edge device coupled to the neighboring routing domain. If the received data packet was not rerouted to the edge device from another edge device coupled to the neighboring routing domain, the edge device reroutes the received data packet to another edge device for forwarding to the neighboring routing domain. However, if the received data packet was rerouted to the edge device from another edge device coupled to the neighboring routing domain, the edge device prevents the received data packet from being rerouted a second time to prevent loops.

20 Claims, 9 Drawing Sheets

U.S. PATENT DOCUMENTS

| | | |
|---|---|---|
| 2003/0233595 A1 | 12/2003 | Charny et al. |
| 2004/0052207 A1 | 3/2004 | Charny et al. |
| 2004/0081085 A1 | 4/2004 | De Cnodder et al. |
| 2004/0109687 A1 | 6/2004 | Park et al. |
| 2004/0196827 A1 | 10/2004 | Xu et al. |
| 2006/0221813 A1 | 10/2006 | Scudder et al. |
| 2009/0245259 A1* | 10/2009 | Filsfils et al. ............... 370/392 |

OTHER PUBLICATIONS

Radia Perlman, "Interconnections Second Edition: Bridges, Routers, Switches, and Internetworking Protocols", Chapter 9 pp. 189-220, Addison Wesley Longman, Inc. 2000.

Radia Perlman, "Interconnections Second Edition: Bridges, Routers, Switches, and Internetworking Protocols", Sections 12.1-12.3 pp. 299-324, Addison Wesley longman, Inc. 2000.

Stephen A. Thomas, "IP Switching and Routing Essentials", Chapter 7 pp. 221-243, 2002.

Ivan Pepelnjak and Jim Guichard, "MPLS and VPN Architectures", Chapters 8-9 pp. 145-205, Cisco Press 2001.

E. Rosen and Y.Rekhter, "BGP/MPLS VPNs", Request for Comments 2547, Mar. 1999.

Y. Rekhter and T. Li, "A Border Gateway Protocol 4 (BGP-4)", Request for Comments 1771, Mar. 1995.

Clarence Filsfils et al., "Fast Reroute (FRR) Protection At the Edge of a RFC 2547 Network", U.S. Appl. No. 11/010,225, filed Dec. 10, 2004.

Clarence Filsfils et al., "Loop Prevention Technique for MPLS Using Two Labels" U.S. Appl. No. 11/046,163, filed Jan. 26, 2005.

Clarence Filsfils et al., "Loop Prevention Technique For MPLS Using Service Labels" U.S. Appl. No. 11/068,081, filed Feb. 28, 2005.

W. Mark Townsley et al., "Encapsulation of MPLS over Layer 2 Tunneling Protocol Version 3", Internet Draft draft-townsley-mpls-over-12tpv3-oo.txt available at http://www.ietf.org, Dec. 2004.

W. Mark Townsley et al., "BGP/MPLS IP VPNs over Layer 2 Tunneling Protocol ver 3", Internet Draft draft-townsley-l3vpn-12tpv3-01.txt available at http://www.ietf.org, Jan. 2004.

Clarence Filsfils et al., "Algorithm for Backup PE Selection", U.S. Appl. No. 11/084,838, filed Mar. 18, 2005.

Stephen A. Thomas, "IP Switching and Routing Essentials", Chapter 2 pp. 25-64, 2002.

* cited by examiner

| ADDRESS PREFIX 820 | VPN LABEL VALUE 830 | EGRESS IDENTIFIER 840 | FRR ENABLE FLAG 850 | FRR EXCLUDE FLAG 860 | BACKUP PE DEVICE 870 | BACKUP LABEL STACK (IGP LABEL, VPN LABEL) 880 |
|---|---|---|---|---|---|---|
| 10.1.2.0/24 | 57 | 1 | 1 | 0 | PE2 | 100, 75 |
| ... | ... | ... | ... | ... | ... | ... |

LABEL FORWARDING TABLE 800

LOOP PREVENTION TECHNIQUES USING ENCAPSULATION MANIPULATION OF IP/MPLS FIELD

RELATED APPLICATIONS

This application is a continuation of U.S. patent application Ser. No. 11/098,173, now issued as U.S. Pat. No. 7,477,593, filed on Apr. 4, 2005 entitled LOOP PREVENTION TECHNIQUES USING ENCAPSULATION MANIPULATION OF IP/MPLS FIELD.

This application is also related to U.S. patent application Ser. No. 11/010,225, entitled FAST REROUTE (FRR) PROTECTION AT THE EDGE OF A RFC 2547 NETWORK, filed Dec. 10, 2004, by Clarence Filsfils et al., the teachings of which are expressly incorporated herein by reference.

This application is related to U.S. patent application Ser. No. 11/046,163, entitled LOOP PREVENTION TECHNIQUE FOR MPLS USING TWO LABELS, filed Jan. 26, 2005, by Clarence Filsfils et al., the teachings of which are expressly incorporated herein by reference.

This application is related to U.S. patent application Ser. No. 11/068,081, entitled LOOP PREVENTION TECHNIQUE FOR MPLS USING SERVICE LABELS, filed Feb. 28, 2005, by Clarence Filsfils et al., the teachings of which are expressly incorporated herein by reference.

FIELD OF THE INVENTION

This invention relates generally to routing data between private routing domains, and, more specifically, to a fast reroute (FRR) technique that quickly and efficiently reroutes network traffic to a neighboring exit point in the event of a node or link failure.

BACKGROUND OF THE INVENTION

A computer network is a geographically distributed collection of interconnected subnetworks, such as local area networks (LAN) that transport data between network nodes. As used herein, a network node is any device adapted to send and/or receive data in the computer network. Thus, in this context, "node" and "device" may be used interchangeably. The network topology is defined by an arrangement of network nodes that communicate with one another, typically through one or more intermediate nodes, such as routers and switches. In addition to intra-network communications, data also may be exchanged between neighboring (i.e., adjacent) networks. To that end, "edge devices" located at the logical outer-bound of the computer network may be adapted to send and receive inter-network communications. Both inter-network and intra-network communications are typically effected by exchanging discrete packets of data according to predefined protocols. In this context, a protocol consists of a set of rules defining how network nodes interact with each other.

Each data packet typically comprises "payload" data prepended ("encapsulated") by at least one network header formatted in accordance with a network communication protocol. The network headers include information that enables network nodes to efficiently route the packet through the computer network. Often, a packet's network headers include a data-link (layer 2) header, an internetwork (layer 3) header and a transport (layer 4) header as defined by the Transmission Control Protocol/Internet Protocol (TCP/IP) Reference Model. The TCP/IP Reference Model is generally described in more detail in Section 1.4.2 of the reference book entitled *Computer Networks, Fourth Edition*, by Andrew Tanenbaum, published 2003, which is hereby incorporated by reference as though fully set forth herein.

A data packet may originate at a source node and subsequently "hop" from node to node along a logical data path until it reaches its addressed destination node. The network addresses defining the logical data path of a data flow are most often stored as Internet Protocol (IP) addresses in the packet's internetwork header. IP addresses are typically formatted in accordance with the IP Version 4 (IPv4) protocol, in which network nodes are addressed using 32 bit (four byte) values. Specifically, the IPv4 addresses are denoted by four numbers between 0 and 255, each number usually delineated by a "dot." A subnetwork may be assigned to an IP address space containing a predetermined range of IPv4 addresses. For example, an exemplary subnetwork may be allocated the address space 128.0.10.*, where the asterisk is a wildcard that can differentiate up to 254 individual nodes in the subnetwork (0 and 255 are reserved values). For instance, a first node in the subnetwork may be assigned to the IP address 128.0.10.1, whereas a second node may be assigned to the IP address 128.0.10.2.

A subnetwork is associated with a subnet mask that may be used to select a set of contiguous high-order bits from IP addresses within the subnetwork's allotted address space. A subnet mask length indicates the number of contiguous high-order bits selected by the subnet mask, and a subnet mask length of N bits is hereinafter represented as /N. The subnet mask length for a given subnetwork is typically selected based on the number of bits required to distinctly address nodes in that subnetwork. Subnet masks and their uses are more generally described in Chapter 9 of the reference book entitled *Interconnections Second Edition*, by Radia Perlman, published January 2000, which is hereby incorporated by reference as though fully set forth herein.

By way of example, assume an exemplary subnetwork is assigned the IP address space 128.0.10.4, and the subnetwork contains two addressable (reachable) network nodes. In this case, 30 address bits are needed to identify the subnetwork 128.0.10.4, and the remaining two address bits are required to distinctly address either of the two nodes in the subnetwork. Thus, the subnetwork may be associated with a subnet mask length of /30 since only the first 30 most-significant bits of an IP address are required to uniquely address this subnetwork. As used herein, an "address prefix" is defined as the result of applying a subnet mask to a network address. For example, consider the address prefix 128.0.10.1/24. In this case, the network portion of the prefix contains the 24 most-significant bits of the IP address 128.0.10.1, i.e., the network is 128.0.10.0, and the last 8 bits are used to identify hosts on that network. An IP address and an address prefix are said to "match" when the prefix's network portion equals the IP address's most-significant bits.

Interior Gateway Protocols

A computer network may contain smaller groups of one or more subnetworks which may be managed as separate routing domains. As used herein, a routing domain is broadly construed as a collection of interconnected network nodes under a common administration. Often, a routing domain is managed by a single administrative entity, such as a company, an academic institution or a branch of government. Such a centrally-managed routing domain is sometimes referred to as an "autonomous system." In general, a routing domain may operate as an enterprise network, a service provider or any other type of network or subnetwork. Further, the routing domain may contain one or more edge devices having "peer" connections to edge devices in adjacent routing domains.

Network nodes in a routing domain are typically configured to forward data using predetermined paths from "interior gateway" routing protocols, such as conventional link-state protocols and distance-vector protocols. These interior gateway protocols (IGP) define the manner with which routing information and network-topology information is exchanged and processed in the routing domain. For instance, IGP protocols typically provide a mechanism for distributing a set of reachable IP subnetworks among the intermediate nodes in the routing domain. As such, each intermediate node receives a consistent "view" of the domain's topology. Examples of link-state and distance-vectors protocols known in the art, such as the Open Shortest Path First (OSPF) protocol and Routing Information Protocol (RIP), are described in Sections 12.1-12.3 of the reference book entitled *Interconnections, Second Edition*, by Radia Perlman, published January 2000, which is hereby incorporated by reference as though fully set forth herein.

The Border Gateway Protocol (BGP) is usually employed as an "external gateway" routing protocol for routing data between autonomous systems. The BGP protocol is well known and generally described in Request for Comments (RFC) 1771, entitled *A Border Gateway Protocol 4* (BGP-4), by Y. Rekhter et al., published March 1995, which is publicly available through the Internet Engineering Task Force (IETF) and is hereby incorporated by reference in its entirety. A variation of the BGP protocol, known as internal BGP (iBGP), is often used to distribute inter-network reachability information (address prefixes) among BGP-enabled edge devices in a routing domain. To implement iBGP, the edge devices must be "fully meshed," i.e., such that every device is coupled to every other device by way of a TCP connection. In practice, conventional route reflectors are used to logically couple devices into a full mesh. The BGP protocol also may be extended for compatibility with other services other than standard Internet connectivity. For instance, Multi-Protocol BGP (MP-BGP) supports various address family identifier (AFI) fields that permit BGP messages to transport multi-protocol information, such as is the case with RFC 2547 services.

A network node in a routing domain may detect a change in the domain's topology. For example, the node may become unable to communicate with one of its neighboring nodes, e.g., due to a link failure between the nodes or the neighboring node failing, such as going "off line" for repairs. If the detected node or link failure occurred within the routing domain, the detecting node may advertise the intra-domain topology change to other nodes in the domain using an interior gateway protocol, such as OSPF. Similarly, if an edge device detects a node or link failure that prevents communications with a neighboring routing domain, the edge device may disseminate the inter-domain topology change to its other fully-meshed edge devices, e.g., using the iBGP protocol. In either case, there is an inherent latency of propagating the network-topology change within the routing domain and having nodes in the domain converge on a consistent view of the new network topology, i.e., without the failed node or link.

Multi-Protocol Label Switching/Virtual Private Network Architecture

A virtual private network (VPN) is a collection of network nodes that establish private communications over a shared backbone network. Previously, VPNs were implemented by embedding private leased lines in the shared network. The leased lines (i.e., communication links) were reserved only for network traffic among those network nodes participating in the VPN. Today, the above-described VPN implementation has been mostly replaced by private "virtual circuits" deployed in public networks. Specifically, each virtual circuit defines a logical end-to-end data path between a pair of network. nodes participating in the VPN. When the pair of nodes is located in different routing domains, edge devices in a plurality of interconnected routing domains may have to cooperate to establish the nodes' virtual circuit.

A virtual circuit may be established using, for example, conventional layer-2 Frame Relay (FR) or Asynchronous Transfer Mode (ATM) networks. Alternatively, the virtual circuit may "tunnel" data between its logical end points using known layer-2 and/or layer-3 tunneling protocols, such as the Layer-2 Tunneling Protocol (L2TP) and the Generic Routing Encapsulation (GRE) protocol. In this case, one or more tunnel headers are prepended to a data packet to appropriately route the packet along the virtual circuit. The Multi-Protocol Label Switching (MPLS) protocol may be used as a tunneling mechanism for establishing layer-2 virtual circuits or layer-3 network-based VPNs through an IP network.

MPLS enables network nodes to forward packets along predetermined "label switched paths" (LSP). Each LSP defines a logical data path, or virtual circuit, between a pair of source and destination nodes; the set of network nodes situated along the LSP may be determined using reachability information provided by conventional interior gateway protocols, such as OSPF. Unlike traditional IP routing, where node-to-node ("next hop") forwarding decisions are performed based on destination IP addresses, MPLS-configured nodes instead forward data packets based on "label" values (or "tag" values) added to the IP packets. As such, a MPLS-configured node can perform a label-lookup operation to determine a packet's next-hop destination. MPLS traffic engineering provides additional advantages over IP-based routing, such as enabling MPLS-configured nodes to reserve network resources, such as bandwidth, to ensure a desired quality of service (QoS).

Each destination represented via a LSP is associated with a locally allocated label value at each hop of the LSP, such that the locally allocated label value is carried by data packets forwarded over its associated hop. The MPLS label values are typically distributed among the LSP's nodes using, e.g., the Label Distribution Protocol (LDP), Resource Reservation Protocol (RSVP) or MP-BGP protocol. Operationally, when a data packet is received at a MPLS-configured node, the node extracts the packet's transported label value, e.g., stored at a known location in the packet's encapsulating headers. The extracted label value is used to identify the next network node to forward the packet. Typically, an IGP label determines the packet's next hop within a routing domain, and a VPN label determines the packet's next hop across routing domains. More generally, the IGP label may be a MPLS label or any other encapsulation header used to identify the packet's next hop in the routing domain.

The packet may contain a "stack" of labels such that the stack's top-most label determines the packet's next-hop destination. After receiving the packet, the MPLS-configured node "pops" (removes) the packet's top-most label from the label stack and performs a label-lookup operation to determine the packet's next-hop destination. Then, the node "pushes" (inserts) a new label value associated with the packet's next hop onto the top of the stack and forwards the packet to its next destination. This process is repeated for every logical hop along the LSP until the packet reaches its destination node. The above-described MPLS operation is described in more detail in Chapter 7 of the reference book entitled *IP Switching and Routing Essentials*, by Stephen Thomas, published 2002, which is hereby incorporated by reference as though fully set forth herein.

Layer-3 network-based VPN services that utilize MPLS technology are often deployed by network service providers for one or more customer sites. These networks are typically said to provide "MPLS/VPN" services. As used herein, a customer site is broadly defined as a routing domain containing at least one customer edge (CE) device coupled to a provider edge (PE) device in the service provider's network ("provider network"). The customer site may be multi-homed to the provider network, i.e., wherein one or more of the customer's CE devices is coupled to a plurality of PE devices. The PE and CE devices are generally intermediate network nodes, such as routers or switches, located at the edge of their respective networks. The PE-CE data links may be established over various physical mediums, such as conventional wire links, optical links, wireless links, etc., and may communicate data formatted using various network communication protocols including ATM, Frame Relay, Ethernet, Fibre Distributed Data Interface (FDDI), etc. In addition, the PE and CE devices may be configured to exchange routing information over their respective PE-CE links in accordance with various interior and exterior gateway protocols, such as BGP, OSPF, RIP, etc.

In the traditional MPLS/VPN network architecture, each customer site may participate in one or more different VPNs. Most often, each customer site is associated with a single VPN, and hereinafter the illustrative embodiments will assume a one-to-one correspondence between customer sites and VPNs. For example, customer sites owned or managed by a common administrative entity, such as a corporate enterprise, may be statically assigned to the enterprise's VPN. As such, network nodes situated in the enterprise's various customer sites participate in the same VPN and are therefore permitted to securely communicate with one another via the provider network. In other words, the provider network establishes the necessary LSPs to interconnect the customer sites participating in the enterprise's VPN. Likewise, the provider network also may establish LSPs that interconnect customer sites participating in other VPNs. This widely-deployed MPLS/VPN architecture is generally described in more detail in Chapters 8-9 of the reference book entitled *MPLS and VPN Architecture, Volume* 1, by I. Pepelnjak et al., published 2001 and in the IETF publication RFC 2547, entitled *BGP/MPLS VPNs*, by E. Rosen et al., published March 1999, each of which is hereby incorporated by reference as though fully set forth herein.

FIG. 1 illustrates an exemplary MPLS/VPN network 100 containing a provider network 110 coupled to neighboring customer sites 120, 130 and 140. The provider network includes a plurality of PE devices 700, including devices PE1 700a, PE2 700b and PE3 700c. The PE devices are fully meshed at the BGP level. That is, each PE device in the provider network can communicate with every other PE device (either directly or by means of BGP route reflectors). The network 110 also contains "core" provider (P) devices 195a-d, such as routers, which are respectively labeled P1, P2, P3 and P4. These P devices may be used to establish label switched paths between pairs of PE devices. For example, the provider devices P1 and P2 may be used to establish a first LSP1 between PE3 and PE1, and the devices P3 and P4 may be used to establish a second LSP2 between PE3 and PE2.

Each neighboring customer site 120-140 contains one or more CE devices attached to PE devices in the provider network 110. For instance, the customer site 120 contains CE devices 160 and 165 (labeled CE1 and CE2) which are respectively coupled to PE1 and PE2. Similarly, the customer site 130 includes a CE device 135 (labeled CE4) attached to PE2 and the customer site 140 includes a CE device 185 (labeled CE3) attached to PE3. The customer sites 120-140 are assigned to respective VPNs. For purposes of illustration, the customer sites 120 and 140 are assigned to the VPN1 and the customer site 130 is assigned to the VPN2. In this arrangement, network nodes in the customer sites 120 and 140 (VPN1) may not establish communications with nodes in the customer site 130 (VPN2) and vice versa since they participate in different VPNs. However, network nodes in the customer site 120 may communicate with nodes in the customer site 140, and vice versa, since the customer sites 120 and 140 both participate in VPN1. Notably, VPN1 and VPN2 may contain overlapping IP address spaces.

As noted, communications may be established through the MPLS/VPN network 100 between remote customer sites participating in the same VPN, e.g., VPN1. The provider network 110 may create a MPLS tunnel, such as LSP1 or LSP2, to provide a logical data path between the remote customer sites of VPN1. Suppose a source node (S) 150 in the customer site 140 addresses a data packet 105 to a destination node (D) 155 in the customer site 120. The source node forwards the packet to its local customer edge device CE3, which in turn transfers the packet across domain boundaries to the provider edge device PE3. PE3 then determines an appropriate LSP over which to forward the packet through the provider network 110 to the customer site 120 containing the packet's addressed destination node 155.

The provider edge device PE3 may associate the received packet 105 with a LSP based on the packet's contained destination IP address. For purposes of discussion, assume the packet 105 is routed from PE3 to PE1 via LSP1, as shown in bold. The packet is received by the provider edge device PE1 at the tail-end of the LSP1 and the packet is then forwarded over the PE1-CE1 link to CE1 in the customer site 120. CE1 receives the packet and forwards it to the destination node 155.

Problems arise in the conventional MPLS/VPN architecture when a node or link failure prevents data communications over a PE-CE data link. For example, suppose that the PE1-CE1 link fails as denoted by a dotted "X." After identifying the failure, the provider edge device PE1 may advertise, within the provider network 110, that it has lost reachability to the IP addresses previously advertised by CE devices in the customer site 120. Accordingly, PE1 may propagate the identified routing change by disseminating iBGP update messages to its fully-meshed PE devices. Eventually, the routing change is distributed throughout the provider network 110 and each PE device updates its local routing information to converge on the new network topology, i.e., without the failed PE1-CE1 link.

The conventional latency required for the PE devices to converge on the new network topology, i.e., without the PE1-CE1 link, is often overly time consuming, e.g., on the order of seconds, and causes a number of significant problems. For instance, data packets are often "dropped" (i.e., discarded) at the edge of the provider network while the network is in the process of converging. For example, in response to the PE1-CE1 link failing, data packets 105 addressed to the destination node 155 will be dropped by PE1 (at the tail-end of LSP1) until the network converges on an alternate data path LSP2 for those packets. For many data flows, such as voice-over-IP (VoIP) and video data flows, this temporary loss of data at PE1 may significantly degrade the utility of the overall data transfer or may cause the data flow to time-out and stop completely.

It is therefore generally desirable for MPLS/VPN networks to achieve faster convergence times, e.g., sub-second convergence times, in response to CE node or link failures over PE-CE links. The MPLS/VPN networks should quickly converge on the new network topology with minimal data loss at the edge of the network.

SUMMARY OF THE INVENTION

The present invention overcomes the disadvantages of the prior art by providing a fast reroute (FRR) technique that may be implemented at the edge of a computer network. In accordance with the technique, if an edge device detects a node or link failure that prevents it from communicating with a neighboring routing domain, the edge device reroutes at least some data packets addressed to that domain to a backup edge device which, in turn, forwards the packets to the neighboring domain. The rerouted packets are designated as being "protected" (i.e., rerouted) data packets before they are forwarded to the backup edge device. To that end, the edge device incorporates an identifier into the rerouted data packets to indicate that the packets are being FRR rerouted. The identifier may be a predetermined value stored at a known location in the rerouted packets' encapsulation headers, such as in their MPLS or IP headers. Upon receiving a data packet containing the identifier, the backup edge device is not permitted to reroute the packet a second time, e.g., in response to another inter-domain node or link failure, thereby preventing loops from developing at the edge of the network.

Advantageously, the inventive technique provides a fast and efficient way for a backup edge device to identify protected data packets that have been previously rerouted in response to, e.g., a CE node or PE-CE link failure. The technique is not limited to MPLS/VPN network architectures and may be deployed at the edge of networks implementing various topologies and protocols. Further, the invention is not limited to any particular hardware platform or set of software capabilities.

BRIEF DESCRIPTION OF THE DRAWINGS

The above and further advantages of the invention may be better understood by referring to the following description in conjunction with the accompanying drawings in which like reference numerals indicate identically or functionally similar elements, of which:

FIG. 8 is a schematic block diagram of an illustrative label forwarding table configured to store FRR-related information.

DETAILED DESCRIPTION OF ILLUSTRATIVE EMBODIMENTS

In accordance with the illustrative embodiments, if an edge device detects a node or link failure that prevents it from communicating with devices in a neighboring domain, the edge device reroutes at least some data packets addressed to the neighboring domain to a backup edge device. The rerouted packets are preferably "tunneled" to the backup edge device, e.g., using an IP or MPLS tunneling mechanism. After receiving the rerouted packets, the backup edge device forwards the packets to the neighboring domain. Notably, the backup edge device is not permitted to reroute the received packets a second time, e.g., upon identifying another inter-domain node or link failure. As such, packet loops are avoided at the edge of the network.

Figure 1:
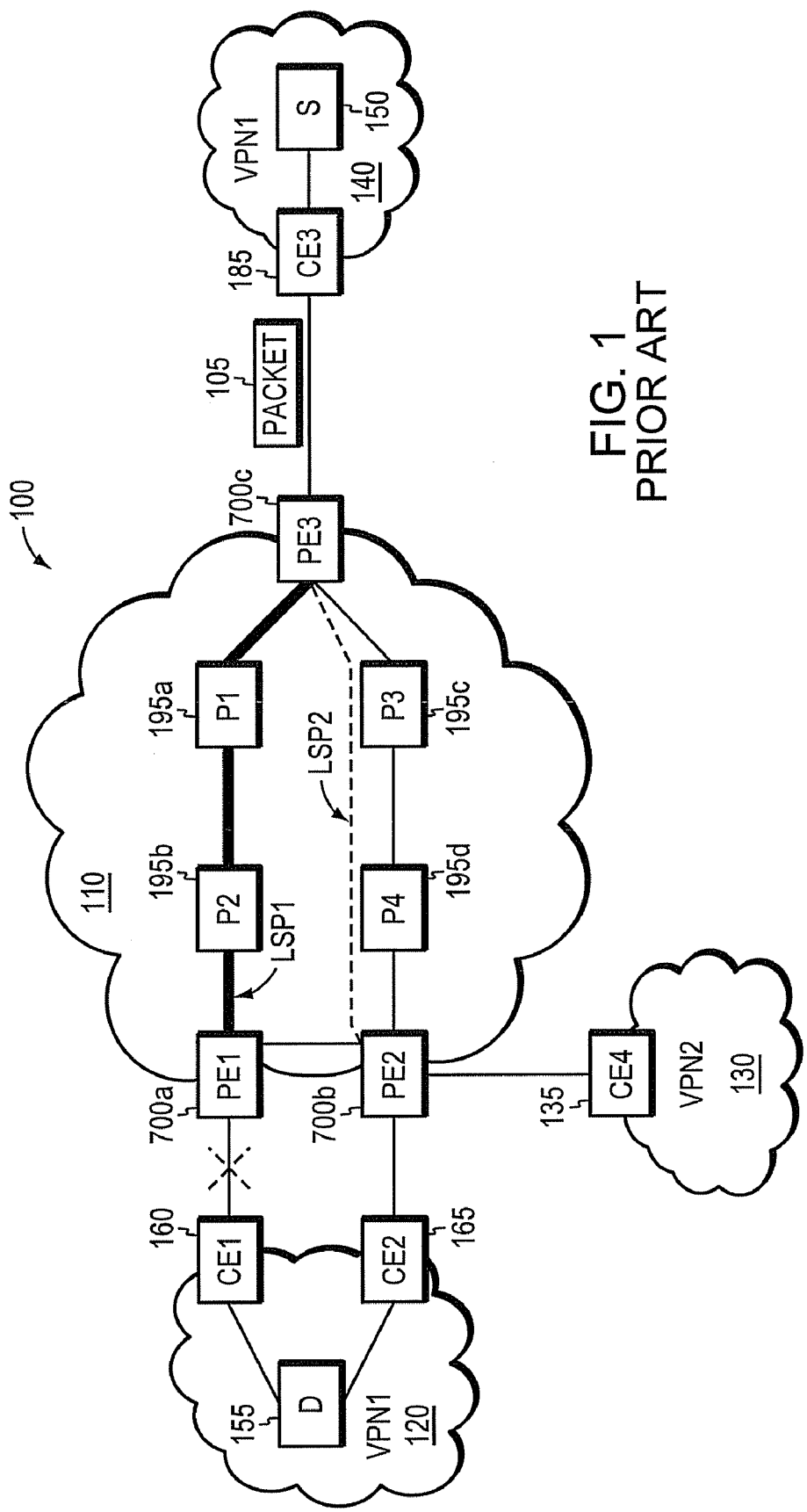
FIG. 1, previously described, is a schematic block diagram of a MPLS/VPN network topology.
Figure 2:
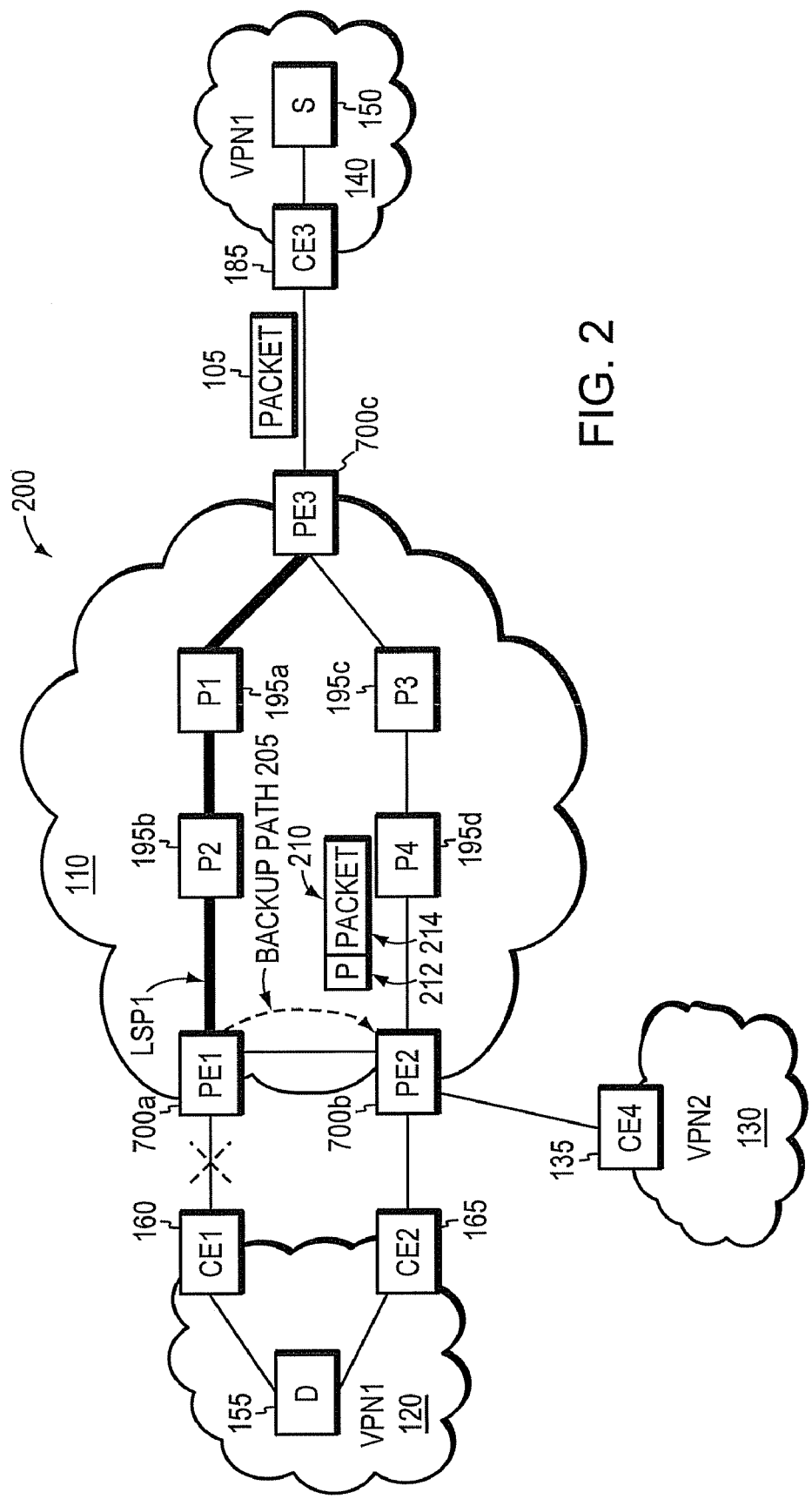
FIG. 2 is a schematic block diagram of an exemplary MPLS/VPN network topology in which the illustrative fast reroute (FRR) technique may be employed at the edge of the network. Those skilled in the art will appreciate that the network topology of FIG. 2 is merely representative and that the inventive FRR technique may be employed in other network topologies as well.

FIG. 2 illustrates a computer network 200 employing an illustrative embodiment of the invention. For ease of explanation, the network topology of network 200 is the same as that shown in FIG. 1. However, unlike in the network 100, the provider edge device PE1 does not "drop" packets upon losing communication with its neighboring customer site 120, e.g., due to a CE1 node failure or PE1-CE1 link failure. Instead, PE1 establishes a fast reroute (FRR) backup path 205 which is used to reroute at least some packets 210 to a backup provider edge device PE2 which is also coupled to the customer site 120. Packets 210 transported over the FRR backup path 205 may be encapsulated with at least one IP tunnel header or MPLS label stack associated with the backup path.

Prior to forwarding the rerouted packets to the backup edge device PE2, the edge device PE1 designates the rerouted packets as being "protected." For purposes of illustration, the rerouted packet 210 is shown as the concatenation of its protected status ("P") 212 and packet data ("packet") 214. Here, a packet's protected status 212 indicates that the packet is being FRR rerouted in response to an inter-domain node or link failure. Illustratively, the protected status 212 is an identifier, such as a predetermined value or flag, that is stored at a known location in the packet's encapsulation headers. For instance, the identifier may be stored in a known field of an IP header or MPLS label pre-pended to the packet 210. The provider edge device PE2, after receiving the protected packet 210, is not permitted to reroute the packet 210 a second time in the event that it too loses communication with the customer site 120, e.g., due to a CE2 node failure or a PE2-CE2 link failure. Thus, the rerouted packet 210 cannot be circulated within loops created at the edge of the provider network 110.

FIGS. 3-6 illustrate various illustrative embodiments of the invention. For each of these illustrative embodiments, the FRR identifier 212 is preferably stored in the bolded packet-header field (or in a portion thereof). Although not shown, a conventional data-link header is typically prepended to each of the illustrative data packets 300, 400, 500 and 600. Those skilled in the art will understand that the depicted embodiments are merely illustrative, and that the FRR identifier 212 may be stored in other packet-header fields besides those explicitly shown and described. Further, in some embodiments (not shown), the FRR identifier may be stored in multiple packet-header fields, including but not limited to the exemplary packet-header fields described below.

Figure 3:
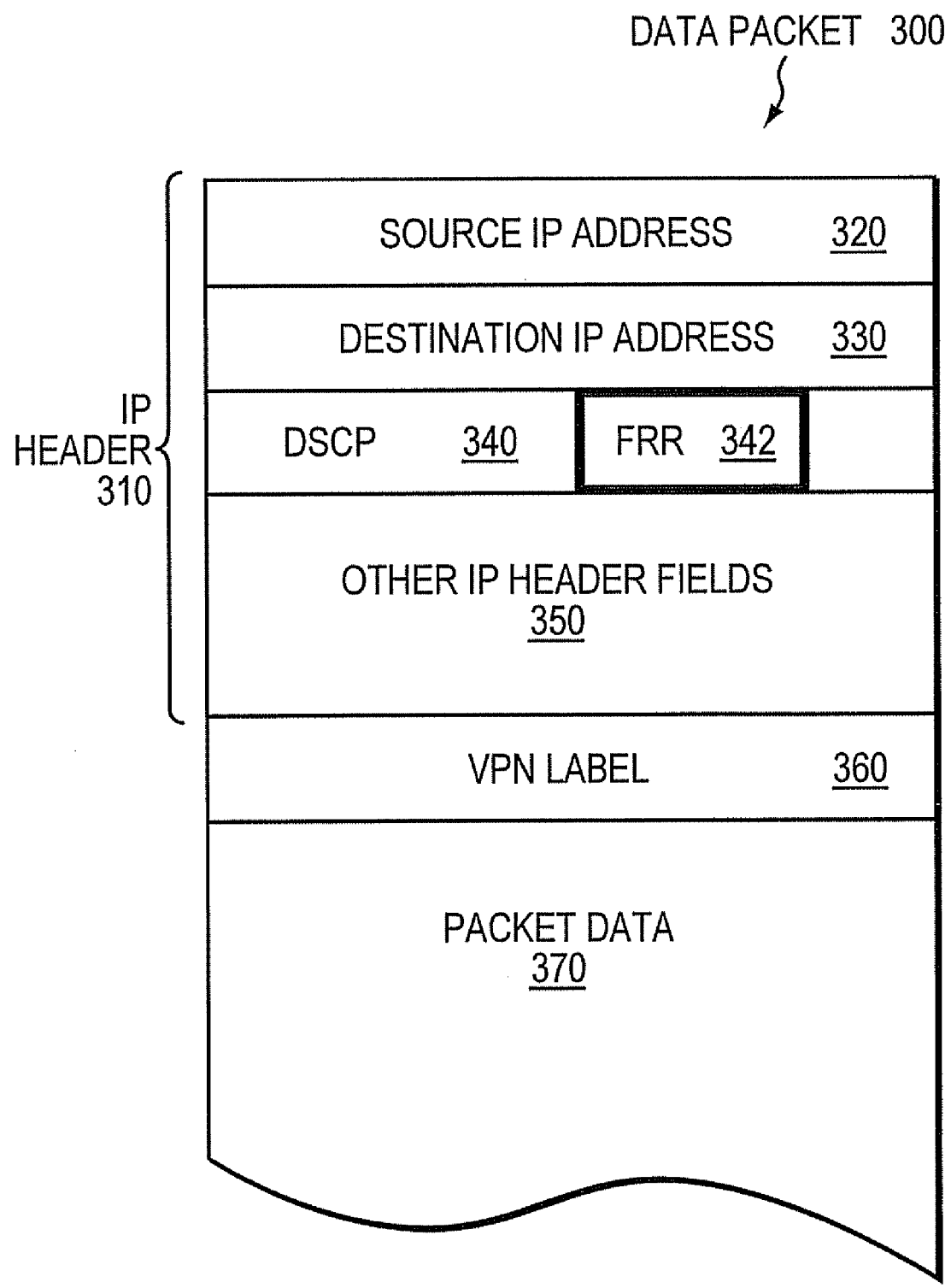
FIG. 3 is a schematic block diagram of an illustrative data packet that includes a Internet Protocol (IP) header in accordance with an illustrative embodiment of the invention.

FIG. 3 illustrates an exemplary FRR-protected data packet 300 that may be rerouted in an IP-based provider network 110. The packet 300 includes an IP header 310, a VPN label 360 and packet data 370. The IP header 310 includes a source IP address field 320, a destination IP address field 330, a differentiated services code point (DSCP) field 340, as well as other IP header fields 350.

The source and destination IP address fields 320 and 330 store IP addresses that may be used to route the packet over the backup path 205 in the IP-based provider network. Specifically, the field 320 stores the IP address of the "source" PE device that reroutes the packet, and the field 330 stores the "destination" IP address of the backup PE device at the tail-end of the backup path 205. The DSCP field 340 is typically a one byte field whose contents are used to prioritize data packets, associate data packets with particular types of service (ToS) and/or provide explicit congestion notification (ECN) or other routing or signaling services. The DSCP field 340 and the other IP header fields 350 are generally described in more detail in pages 25-64 of the reference book entitled *IP Switching and Routing Essentials*, by Stephen Thomas, published 2002, which is hereby incorporated by reference as though fully set forth herein.

In accordance with the illustrative embodiment, a predetermined FRR bit 342 in the DSCP field 340 is used to indicate whether the packet 300 is a protected data packet. Preferably, the same predetermined bit 342, e.g., the least-significant DSCP bit, is used by all PE devices 700 in the provider network to identify FRR-rerouted data packets. If the packet 300 has been FRR rerouted, then the FRR bit 342 is set equal to a first predetermined value (e.g. "1"). On the other hand, the FRR bit equals a second predetermined value, (e.g., "0") if the packet has not been rerouted. Accordingly, when the backup PE device receives the packet 300, the backup PE device can check the value of the packet's FRR bit 342 to determine whether the received packet has been rerouted and is thus FRR protected.

After receiving the data packet 300, the backup PE device performs a label-lookup operation based on the packet's VPN label 360. Under normal conditions, the backup PE device forwards the received packet data 370 to a CE device identified as a result of the VPN label-lookup operation. However, if the backup PE device determines that a PE-CE link failure or CE device failure prevents the packet 300 from being forwarded to the identified CE device, then the backup PE device determines whether the packet is a protected data packet. To that end, the backup PE device checks the value of the packet's FRR bit 342—if the FRR bit equals the first predetermined value indicating that the packet has already been FRR rerouted, then the backup PE device drops (i.e., discards) the received packet. If the FRR bit equals the second predetermined value, the backup PE device sets the bit 342 equal to the first predetermined value, modifies the source and destination IP fields 320 and 330 to route the packet over an appropriate FRR backup path 205, then forwards the packet over the backup path.

Figure 4:
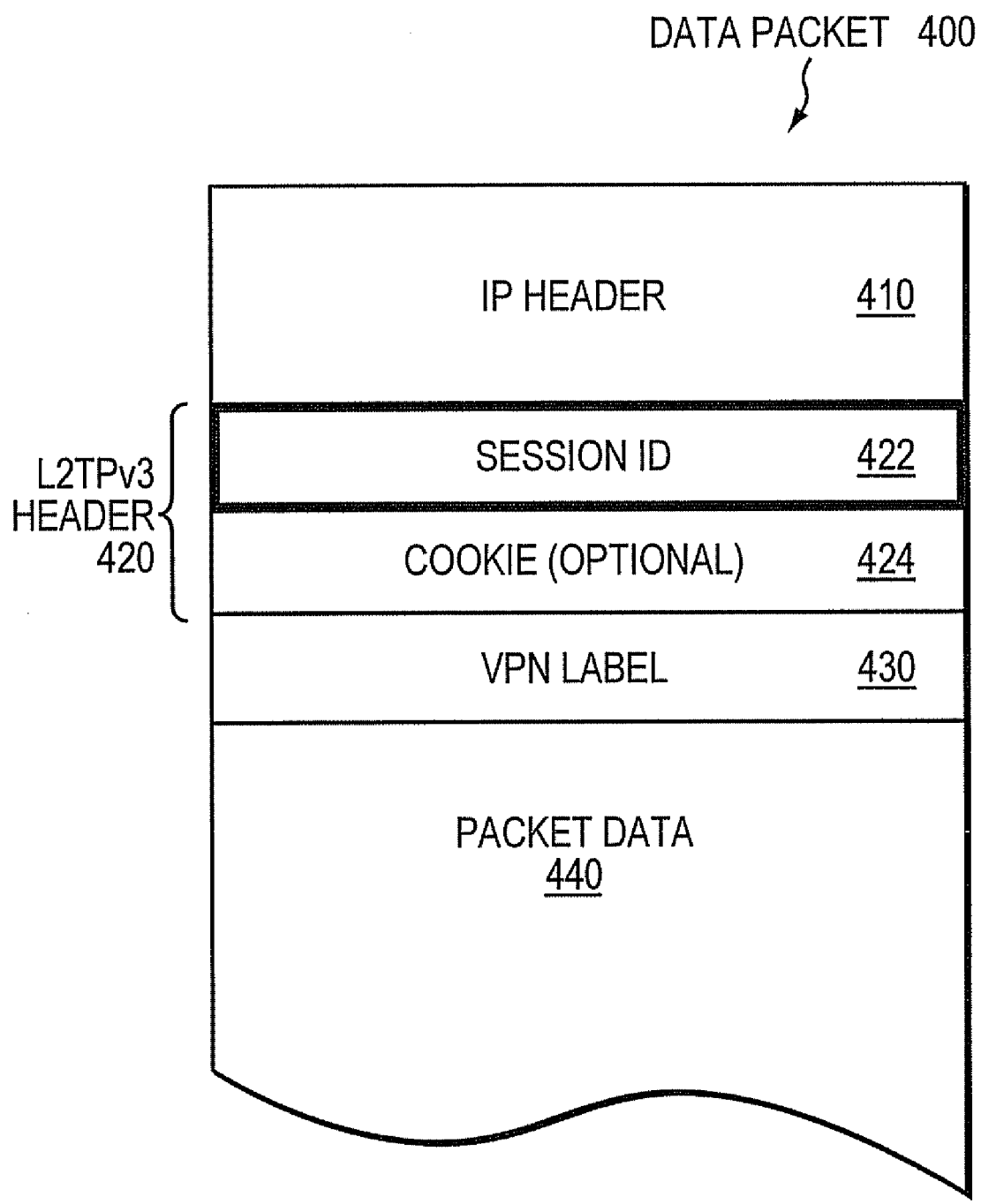
FIG. 4 is a schematic block diagram of an illustrative data packet that includes a Layer-2 Tunnel Protocol (L2TP) header in accordance with an illustrative embodiment of the invention.

FIG. 4 illustrates an alternative embodiment of the invention in which a protected data packet 400 may store a FRR identifier in an IP tunnel header used for routing the packet in an IP-based provider network 110. The packet 400 includes an IP header 410, a Layer-2 Tunnel Protocol version 3 (L2TPv3) header 420, a VPN label 430 and packet data 440. The L2TPv3 header includes a session identifier (ID) field 422 and optionally may include a cookie field 424. The session ID field 422 stores a value that identifies a particular L2TP tunnel established in the IP-based provider network. The cookie field 424 stores a randomly-selected value, e.g., a 64 bit value, that may be used to authenticate the packet 400. Each L2TP session is preferably associated with a unique cookie value that is used to authenticate packets communicated in that session.

When a PE device receives the data packet 400, the value stored in the packet's session ID field 422 is used to identify a particular L2TP routing context at the PE device. The context is then used to determine the packet's next-hop destination. When authentication is employed, the context also may store a randomly selected cookie value that can be compared with the contents of the packet's cookie field 424 (if included). The session ID and cookie fields and their uses for L2TPv3 encapsulation in MPLS/VPN networks are described in more detail in the IETF Internet Draft entitled *Encapsulation of MPLS over Layer 2 Tunneling Protocol Version 3*, by Townsley et al., published October 2004, and in the IETF Internet Draft entitled *BGP/MPLS IP VPNs over Layer 2 Tunneling Protocol ver 3*, by Townsley et al., published January 2004, both of which are hereby incorporated by reference as though fully set forth herein.

In this illustrative embodiment, the session ID field 422 stores different values depending on whether or not the data packet 400 has been rerouted in accordance with FRR operations. Namely, the field 422 stores a first predetermined value when the data packet 400 is not FRR protected and contains a RFC 2547-based VPN label 430; the field 422 stores a second predetermined value when the data packet transports the VPN label and is FRR protected. Notably, other embodiments may set the values of one or more predetermined bits in the session ID field 422 to indicate when the packet 400 is protected. For instance, the session ID field may contain 32 bits, whereby 31 bits store a L2TP session identifier and the remaining bit is a flag indicating whether the packet is FRR protected.

Figure 5:
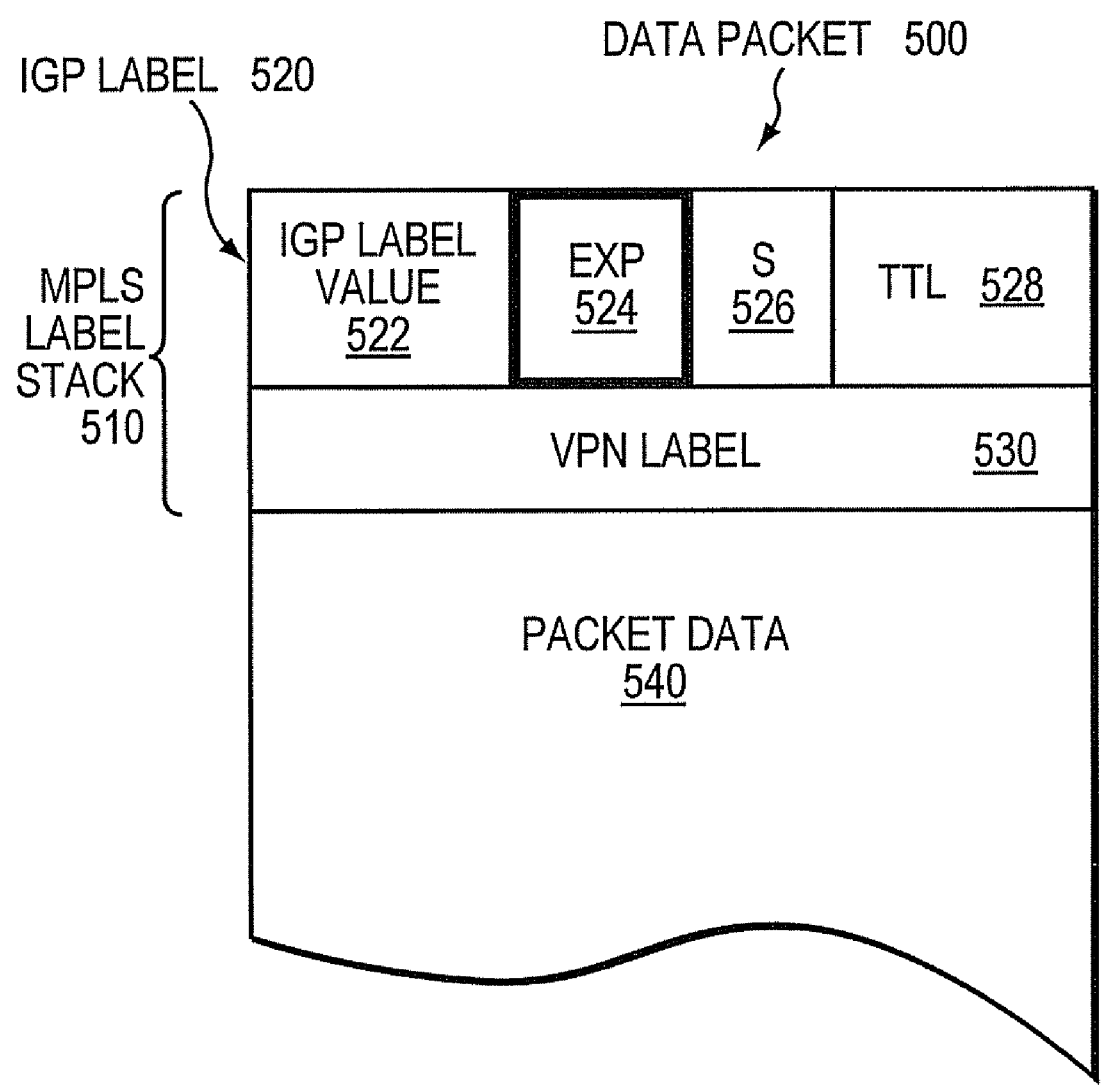
FIG. 5 is a schematic block diagram of an illustrative data packet that includes a MPLS label stack containing an IGP label configured in accordance with an illustrative embodiment of the invention.

FIG. 5 illustrates an exemplary FRR-protected data packet 500 that may be rerouted via an MPLS tunnel in the provider network 110. The data packet 500 includes an MPLS label stack 510 and packet data 540. The label stack includes an IGP label 520 and a VPN label 530. The IGP label is preferably implemented as a conventional 32-bit MPLS label containing a 20-bit IGP label value field 522, a set of three experimental (EXP) bits 524, a one bit stack flag (S) 526 and an 8-bit time-to-live (TTL) field 528. The label field 522 stores a predetermined IGP label value that indicates the packet's next hop in the provider network. The stack flag 526 stores a value that indicates whether the IGP label 520 is located at the bottom of the MPLS label stack 510. For instance, as shown, the stack flag 526 stores a value indicating that the IGP label is not at the bottom of the stack, since the label 520 resides at the top of the stack.

The TTL field 528 generally stores a "hop limit" count that may be used determine when a packet has "aged" and is therefore no longer valid. The TTL field 528 may be initialized to equal a hop count stored in an IP header transported in the packet data 540 and may be decremented after every hop in the provider network, as known in the art. However, other embodiments may not utilize the TTL field 528, e.g., and may set the field to a predetermined "place-holder" value, such as 255.

In accordance with this illustrative embodiment, at least one of the experimental EXP bits 524 is used as an FRR identifier. For example, suppose a single EXP bit, such as the least-significant EXP bit, is used to store that packet's FRR status. As such, if the data packet 500 has been FRR protected, the value of the designated EXP bit 524 equals a first predetermined value (e.g., "1"); otherwise the bit equals a second predetermined value (e.g., "0").

Figure 6:
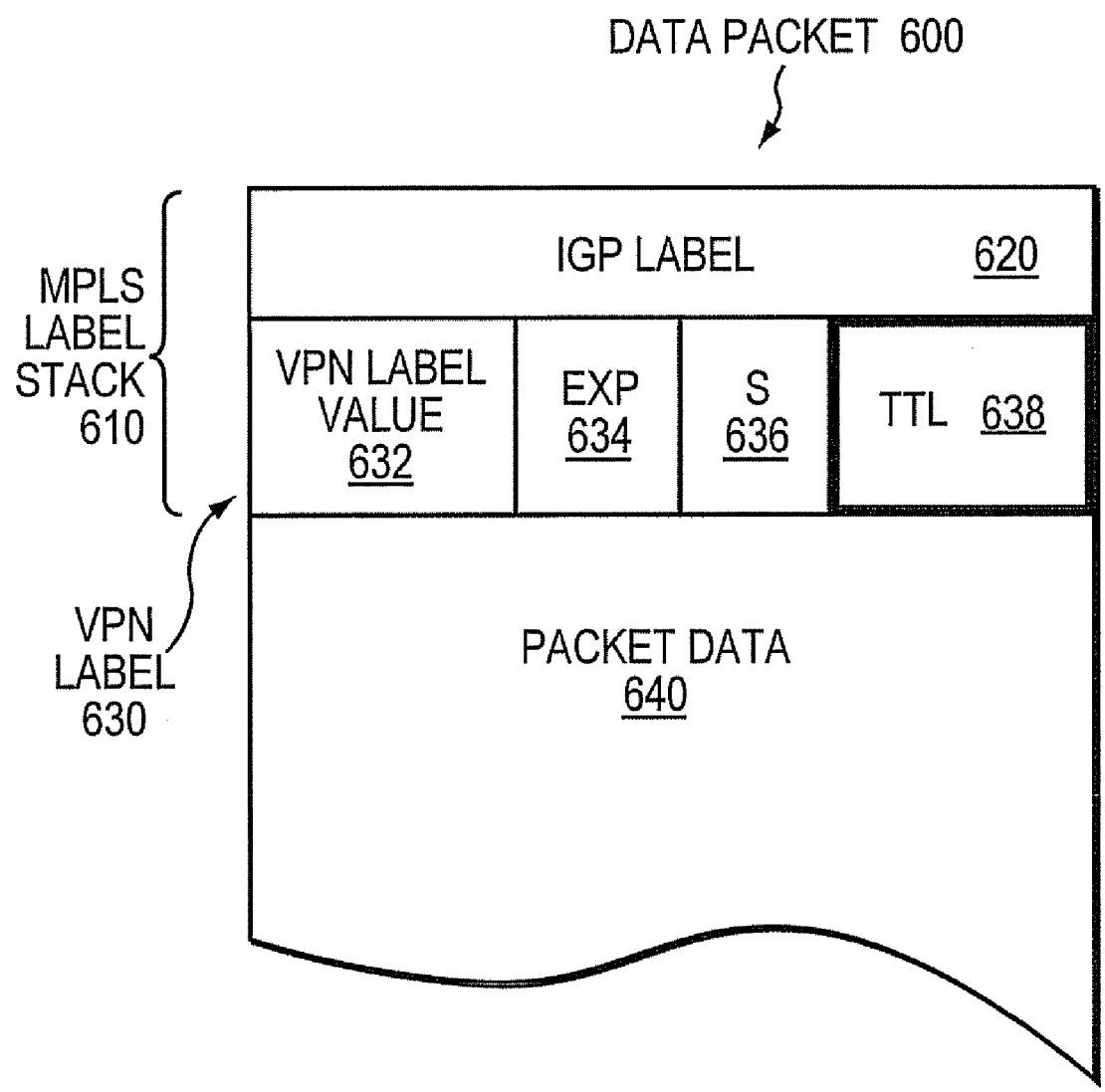
FIG. 6 is a schematic block diagram of an illustrative data packet that includes a MPLS label stack containing a VPN label configured in accordance with an illustrative embodiment of the invention.

FIG. 6 illustrates yet another illustrative embodiment for storing an FRR identifier in an exemplary data packet 600 having MPLS encapsulation. The data packet 600 includes a MPLS label stack 610 having a top IGP label 620 and a bottom VPN label 630 prepended to packet data 640. The VPN label 630 is preferably formatted as a conventional MPLS label having a VPN label value field 632, EXP bits 634, a stack flag (S) 636 and a TTL field 638. The label field 632 stores a predetermined VPN label value that indicates the packet's customer-site destination outside of the provider network 110. The EXP bits are unused. The stack flag 636 stores a value that indicates that the VPN label 630 is located at the bottom of the MPLS label stack 610. According to this illustrative embodiment, the TTL field 638 stores a first predetermined value, e.g., equal to 127 (0x7F hexadecimal), if the data packet 600 has been FRR rerouted. If the packet has not been rerouted, the TTL field stores a second predetermined value, e.g., equal to 1 (0x01 hexadecimal).

Figure 7:
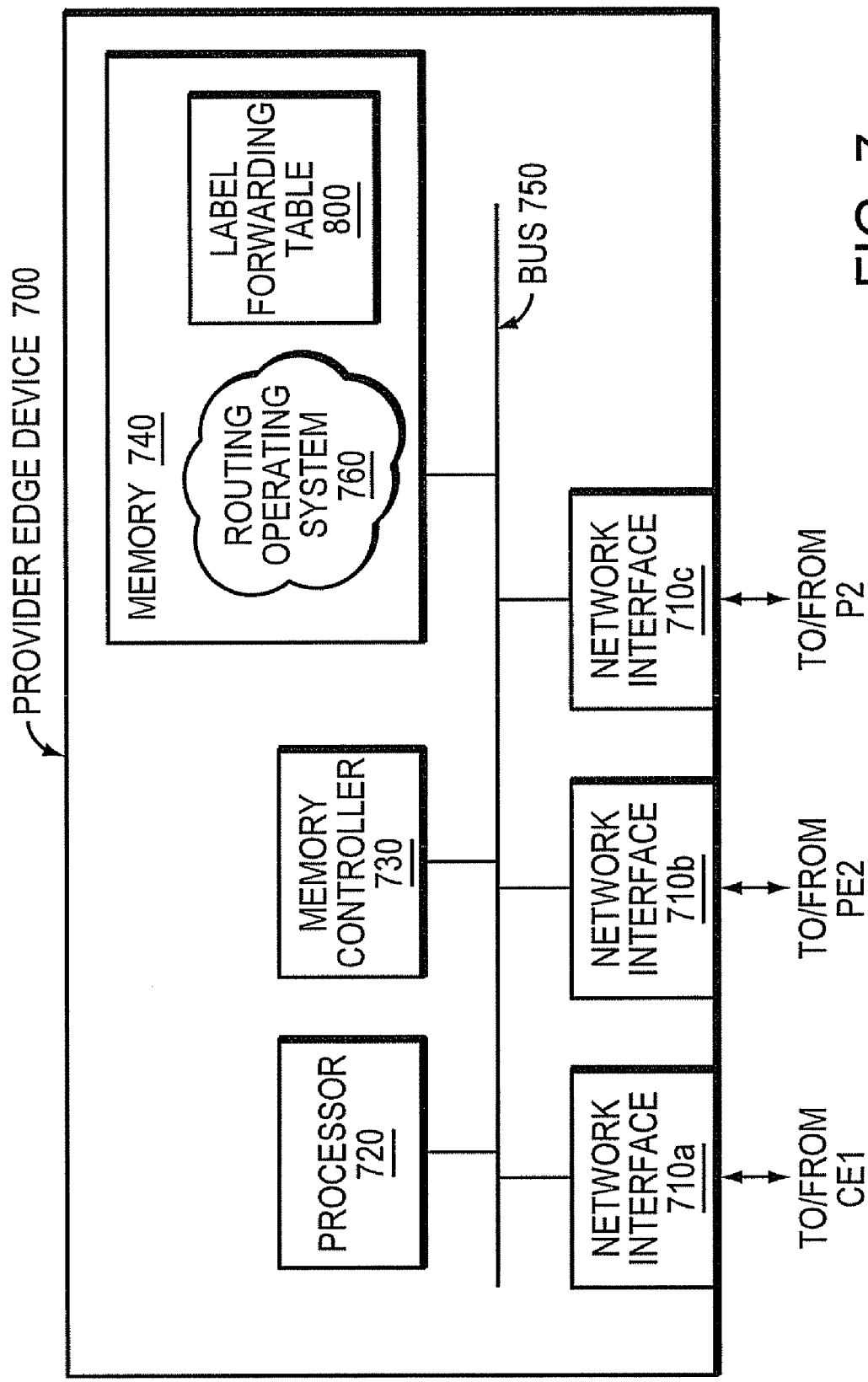
FIG. 7 is a schematic block diagram of a provider edge (PE) device which may implement FRR operations at the edge of a MPLS/VPN network.

FIG. 7 is a schematic block diagram of an exemplary provider edge device 700, such as a router, that may be advantageously used with the present invention. Suitable intermediate nodes that may be used with the present invention include, but are not limited to, the Cisco 7200 and 7600 Series Routers and Catalyst 6500 Series Switches available from Cisco Systems Incorporated, San Jose, Calif. For ease of illustration and description, the PE device 700 is illustrated on a generic hardware platform. However, in alternative embodiments, the PE device may contain a plurality of line cards which are interconnected with a route processing engine through a switching fabric (i.e., backplane logic and circuitry). Accordingly, those skilled in the art will appreciate that the depicted PE device 700 is merely exemplary and that the advantages of the present invention may be realized on a variety of different hardware platforms having various software capabilities.

The PE device 700 comprises one or more network interfaces 710, a processor 720, a memory controller 730 and a memory 740 interconnected by a system bus 750. Each network interface 710 may be a physical or logical interface that connects the PE device 700 with a neighboring node. For example, as shown, the network interface 710*a* is coupled to the customer edge device CE1 located in the customer site 120. The network interfaces 710*b* and 710*c* are respectively coupled to the devices PE2 and P2 in the provider network 110. Each network interface 710 may be adapted to transfer and acquire data packets to and from various transport media such as, e.g., Fast Ethernet (FE), Gigabit Ethernet (GE), wireless links, optical links, etc. Functionally, the interfaces 710 may be configured to communicate using various network communication protocols, including but not limited to Asynchronous Transfer Mode (ATM), Ethernet, frame relay (FR), multi-channel T3, synchronous optical network (SONET), Fibre Distributed Data Interface (FDDI), and so forth.

The memory 740 comprises a plurality of storage locations that are addressable by the processor 720 and the network interfaces 710 via the memory controller 730. The memory 740 preferably comprises a form of random access memory (RAM) that is generally cleared by a power cycle or other reboot operation (e.g., it is a "volatile" memory). For instance, the memory 740 may comprise dynamic RAM (DRAM) and/or synchronous DRAM (SDRAM) storage locations adapted to store program code and data structures accessible to the processor 720. It will be apparent to those skilled in the art that the memory 740 also may comprise other memory means, including various computer-readable media, for storing program instructions and data structures pertaining to the operation of the PE device 700. Further, those skilled in the art will appreciate that at least some portions of the memory 740 may be embodied as electromagnetic signals that are transmitted from a remote memory element to the PE device 700.

The memory 740 stores, among other things, computer-readable instructions for implementing a routing operating system 760 that functionally organizes the PE device 700 by, e.g., invoking network operations in support of software processes and services executing on the processor 720. The IOS™ operating system by Cisco Systems Incorporated is one example of an operating system 760 that may be stored in the memory 740 and executed in accordance with the illustrative embodiments herein. The IOS operating system includes various routing services, such as conventional interior and exterior gateway protocols. The present invention also may be deployed with other operating systems, such as the IOS-XR™ operating system by Cisco Systems Incorporated, in which one or more of these routing services is executed as a separate process, i.e., having its own process address space apart from the operating system's.

The memory 740 stores a label forwarding table 800 (or "label forwarding information base (LFIB)") configured to store VPN label information used to forward data packets from the PE device 700 to neighboring customer sites. The memory 740 may include a separate label forwarding table (not shown) for storing IGP label information used to forward data packets within the provider network 110. When the PE device 700 receives a data packet from a P or PE device in the provider network 110, the operating system 760 may locate a VPN label value in the received packet's MPLS label stack. The operating system then may perform a label lookup operation in the label forwarding table 800 based on the packet's VPN label value. The result of the lookup operation can be used to determine a particular PE-CE link over which the received packet should be forwarded next.

FIG. 8 illustrates an exemplary label forwarding table 800 that may be used in accordance with the first illustrative embodiment. The table 800 includes a plurality of table entries 810, each of which is configured to store, among other things, an address pre-fix value 820, a VPN label value 830, an egress identifier value 840, a "FRR enable" flag value 850, a "FRR exclude" flag value 860, one or more backup PE device identifiers 870 and a backup MPLS label stack 880. The address prefix value 820 stores an IP address prefix that is reachable to the PE device 700 from a directly-attached CE device. The VPN label value 830 indicates to which VPN the address prefix value 820 belongs. The egress identifier value 840 is used to identify which network interface 710 should be used to forward data packets containing VPN label values equal to the VPN label value 830 and whose destination IP addresses match the address prefix value 820.

The FRR enable flag 850 stores a value indicating whether FRR operations are currently being performed for data packets having VPN label values and destination IP addresses that match the contents of the table entry 810. When the operating system 760 detects a node or link failure over a PE-CE data link, the operating system sets the FRR enable flag values for those IP address prefixes 820 that were reachable over the failed PE-CE link. As used herein, the FRR enable flag 850 is "set" when it equals a first pre-determined value (e.g. "1"). Otherwise, the FRR enable flag equals a second predetermined value (e.g., "0").

The FRR exclude flag 860 stores a value indicating whether FRR operations should not be performed even when the FRR enable flag 850 is set. The FRR exclude flag may equal a first predetermined value (e.g. "1") to indicate that FRR operations are not permitted to be performed and may equal a second predetermined value (e.g., "0") otherwise. The value of the FRR exclude flags 860 may be manually selected, e.g., by a system administrator. However, in a preferred embodiment, the FRR exclude flag values are dynamically determined by the routing operating system 760. For instance, the operating system may specify that only address prefixes advertised by selected customer sites or by customer sites participating in certain VPNs may be FRR protected.

A set of one or more backup PE devices 870 may be associated with each address prefix value 820. Each backup PE device may be associated with a backup label stack 880, e.g., including an IGP label value and a VPN label value, that should be included in FRR rerouted packets 210 matching the table entry 810. In an IP-based provider network, the IGP label value may be a next-hop destination IP address; in a MPLS-based network, the IGP label value is a MPLS label value. In this latter case, the IGP label value may be determined based on the contents of a separate label forwarding table (not shown) configured to store IGP label information used to forward data packets within the provider network 110. The backup PE devices 870 and their backup label stacks 880 may be statically configured, e.g., by a system administrator, or dynamically "learned" by the operating system 760.

As shown, the exemplary label forwarding table 800 contains a table entry 810 for received data packets storing a VPN label value equal to 57 and a destination IP address matching the address prefix value 10.1.2.0/24. In this example, the flag values 850 and 860 indicate that FRR operations are currently underway and have not been excluded for non-protected data packets containing VPN label values equal to 57. The egress identifier value 840 indicates over which network interface 710 the received data packets should be forwarded. The table entry 810 also indicates that data packets matching the prefix 820 and VPN label value 830 should be FRR rerouted to the backup PE device PE2, and that the rerouted packets should include a MPLS label stack having an IGP label value equal to 100 and a VPN label value equal to 75.

Figure 9:
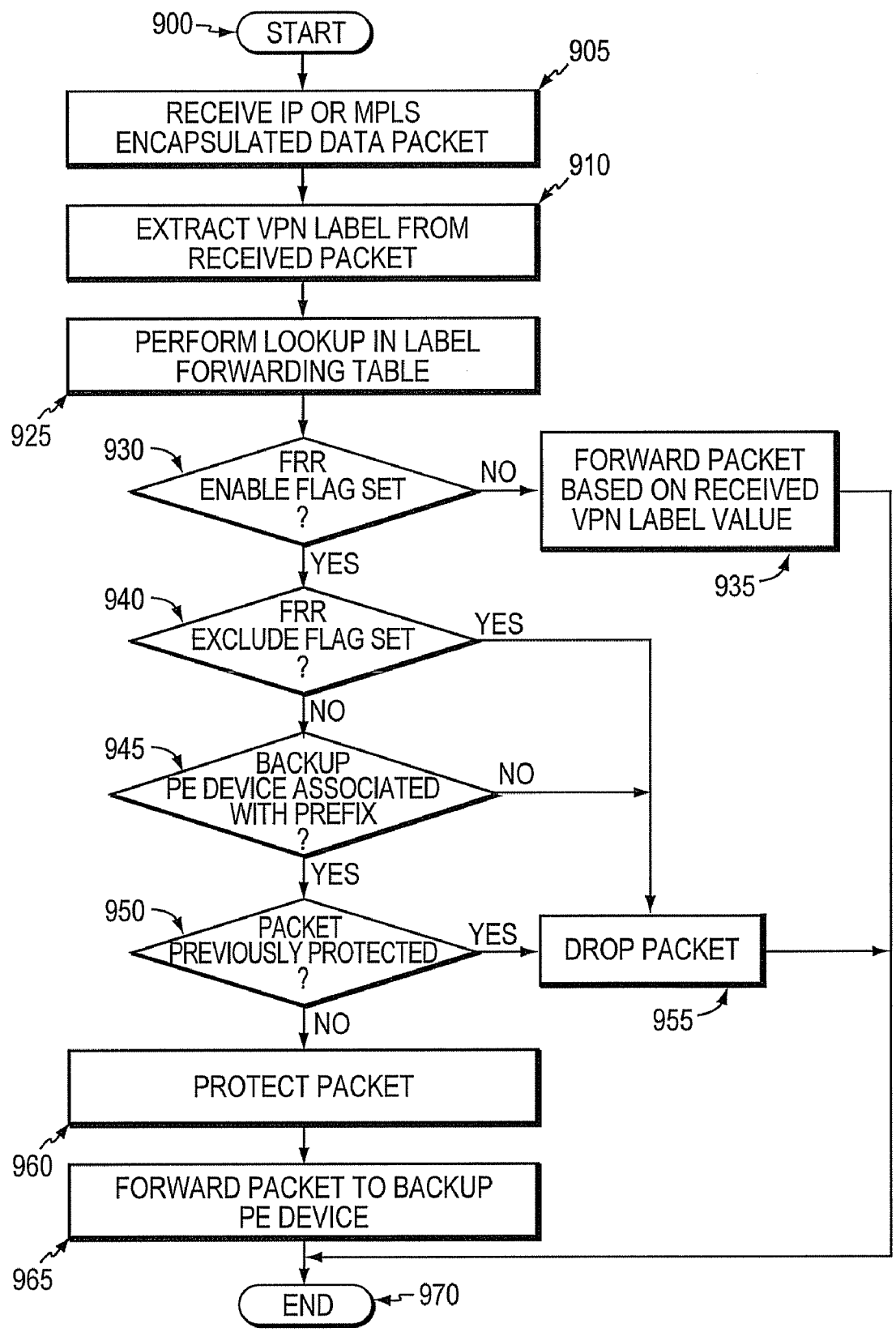
FIG. 9 is a flowchart illustrating a sequence of steps for performing FRR operations at the edge of a network in accordance with the illustrative embodiments of the invention.

FIG. 9 illustrates a flowchart containing a sequence of steps for performing the FRR technique of the present invention. The sequence begins at step 900 and proceeds to step 905 where an IP or MPLS encapsulated data packet is received at a PE device 700. The PE device's routing operating system 760 extracts a VPN label value from the received packet, at step 910, and uses the extracted VPN label value to perform a lookup operation in its label forwarding table 800, at step 925. Specifically, a table entry 810 is located having an address prefix 820 matching the packet's destination IP address and a VPN label value 830 equal to the packet's extracted VPN label value.

At step 930, the FRR enable flag 850 in the located table entry 810 is analyzed to determine whether FRR operations are currently being performed for packets containing the received VPN label value. If FRR operations are not currently underway, the received packet is processed based on the packet's matching table entry 810. The received data packet is then forwarded to its next-hop destination at step 935. The sequence ends at step 970.

If, at step 930, the value of the FRR enable flag indicates that FRR operations should be performed, then at step 940 the FRR exclude flag 860 is analyzed to determine whether the packet is permitted to be FRR rerouted. If the packet is not allowed to be rerouted, the packet is dropped at step 955 and the sequence ends at step 970. When the FRR exclude flag value indicates that FRR operations may be performed for the received packet, the sequence advances to step 945 where it is determined whether there is a backup PE device 870 identified in the received packet's matching label-table entry 810. If no such backup PE device exists, then at step 955 the packet is dropped and the sequence ends at step 970.

At step 950, the routing operating system 760 determines whether the received packet has been previously FRR protected. For instance, the packet's protected status may be ascertained based on a FRR identifier or flag value stored at a predetermined location in the received packet's encapsulation headers, such as its IP header or MPLS label stack. In accordance with the inventive FRR technique, a protected packet may not be protected a second time. Therefore, if at step 950 the received packet is determined to already have been protected, the packet is dropped at step 955 and the sequence ends at step 970.

On the other hand, if the packet was not previously protected, the sequence advances to step 960 and the packet is protected. For instance, a predetermined FRR identifier value may be stored at a known location in the packet's IP header or MPLS label stack. For example, the identifier value may be stored as described one or more of the illustrative embodiments of FIGS. 3-6. Of course, those skilled in the art will appreciate that other packet-header fields also may be employed for storing such a FRR identifier. The protected packet is forwarded to its backup PE device, at step 965, preferably via a MPLS or IP tunnel. The sequence ends at step 970.

Advantageously, the inventive technique provides a fast and efficient way for a backup edge device to identify protected data packets that have been previously rerouted in response to, e.g., a CE node or PE-CE link failure. The technique is not limited to MPLS/VPN network architectures and may be deployed at the edge of networks implementing various topologies and protocols. Further, the invention is not limited to any particular hardware platform or set of software capabilities.

The foregoing has been a detailed description of illustrative embodiments of the invention. Various modifications and additions can be made without departing from the spirit and scope of the invention. For example, although the illustrative embodiments utilize a single FRR identifier value to denote which packets are protected, other embodiments may utilize multiple FRR identifier values, at least some of which are stored in encapsulation headers in accordance with the illustrative embodiments described herein. Yet other alternative embodiments may store at least one FRR identifier value in multiple encapsulation header fields. For instance, the identifier value may be determined based on the contents of a plurality of IP and/or MPLS header fields prepended to a data packet.

While the inventive FRR technique has been illustratively described with respect to MPLS/VPN networks, it is also expressly contemplated that the invention may be deployed at the edge of other types of networks and subnetworks, such as autonomous systems, broadcast domains, routing areas, etc., that implement various network communication protocols. Although the illustrative embodiments described herein assume a one-to-one correspondence between customer sites and VPNs, those skilled in the art will understand that the FRR technique also may be deployed in networks in which customer sites are permitted to participate in more than one VPN.

Furthermore, the illustrative embodiments may be modified to utilize IP Version 6 (IPv6) technology. The IPv6 protocol has been introduced to increase the number of available network addresses and provide additional services at the internetwork layer of the conventional TCP/IP protocol stack.

The IPv6 protocol employs a larger address space than its IPv4 predecessor, and utilizes 128 bit (sixteen byte) values to address network nodes rather than the 32 bit addresses employed by IPv4. Those skilled in the art will appreciate that the illustrative embodiments described herein are equally applicable to other address formats, including IPv6 addresses.

It is expressly contemplated that the teachings of this invention can be implemented as software, including a computer-readable medium having program instructions executing on a computer, hardware, firmware, or a combination thereof. For instance, the invention may be implemented by a PE device 700 having one or more processors, some of which may reside on the network interfaces 710 or on line cards containing the network interfaces. Further, the memory 740 may be distributed among a plurality of different memory elements, both local and remote to the PE device 700. In general, the inventive technique may be implemented in various combinations of hardware and/or software. Accordingly, this description is meant to be taken only by way of example and not to otherwise limit the scope of the invention.

What is claimed is:

1. An apparatus comprising:
   a processor;
   a first network interface configured to communicate with a neighboring routing domain;
   a second network interface configured to receive a data packet that is directed to the neighboring routing domain; and
   a memory configured to store instructions that when executed by the processor,
      detect a failure that prevents communication with the neighboring routing domain over the first network interface,
      determine if the received data packet was previously rerouted to the apparatus from an edge device coupled to the neighboring routing domain,
      if the received data packet was not previously rerouted to the apparatus from an edge device coupled to the neighboring routing domain, reroute the received data packet to another edge device for forwarding to the neighboring routing domain, and
      if the received data packet was previously rerouted to the apparatus from an edge device coupled to the neighboring routing domain, prevent the received data packet from being rerouted a second time to prevent loops.

2. The apparatus of claim 1 wherein the instructions that when executed by the processor determine if the received data packet was previously rerouted determine if a fast reroute (FRR) identifier value is stored in a field of the received data packet.

3. The apparatus of claim 2 wherein the field is part of a differentiated services code point (DSCP) field of an Internet Protocol (IP) header.

4. The apparatus of claim 2 wherein the field is part of an interior gateway protocol (IGP) label stored in a label stack.

5. The apparatus of claim 4 wherein the label stack is a Multi-Protocol Label Switching (MPLS) label stack.

6. The apparatus of claim 4 wherein the field is one or more experimental (EXP) bits of the IGP label.

7. The apparatus of claim 1 wherein the instructions that when executed by the processor determine if the received data packet was previously rerouted determine if a particular value is stored in a field of an Internet Protocol (IP) tunnel header.

8. The apparatus of claim 7 wherein the Internet Protocol (IP) tunnel header is a Layer-2 Tunnel Protocol (L2TP) header, and the particular value is a session identifier (ID) that has a different value depending on whether or not the data packet has been previously rerouted.

9. The apparatus of claim 1 wherein the instructions that when executed by the processor prevent the received data packet from being rerouted a second time drop the received data packet.

10. The apparatus of claim 1 wherein the failure that prevents communication with the neighboring routing domain over the first network interface is a failure of an edge device in the neighboring routing domain or a failure of a link coupling the first network interface to the edge device in the neighboring routing domain.

11. A method comprising:
    communicating, by an edge device, with a neighboring routing domain;
    detecting a failure that prevents communication between the edge device and the neighboring routing domain;
    receiving, at the edge device, a data packet that is directed to the neighboring routing domain;
    determining if the received data packet was rerouted to the edge device from another edge device coupled to the neighboring routing domain;
    if the received data packet was not rerouted to the edge device from another edge device coupled to the neighboring routing domain, rerouting the received data packet to another edge device for forwarding to the neighboring routing domain; and
    if the received data packet was rerouted to the edge device from another edge device coupled to the neighboring routing domain, preventing the received data packet from being rerouted a second time to prevent loops.

12. The method of claim 11 wherein the determining if the received data packet was rerouted comprises:
    determining if a fast reroute (FRR) identifier value is stored in a field of the received data packet.

13. The method of claim 12 wherein the field is part of a differentiated services code point (DSCP) field of an Internet Protocol (IP) header.

14. The method of claim 12 wherein the field is part of an interior gateway protocol (IGP) label stored in a label stack.

15. The method of claim 11 wherein the determining if the received data packet was rerouted comprises:
    determining if a particular value is stored in a field of an Internet Protocol (IP) tunnel header.

16. The method of claim 15 wherein the Internet Protocol (IP) tunnel header is a Layer-2 Tunnel Protocol (L2TP) header and the particular value is a session identifier (ID) that has a different value depending on whether or not the data packet has been previously rerouted.

17. The method of claim 11 wherein the preventing the received data packet from being rerouted a second time comprises:
    dropping the received data packet.

18. The method of claim 11 wherein the failure that prevents communication between the edge device and the neighboring routing domain is a failure of an edge device in the neighboring routing domain or a failure of a link coupling the edge device to the edge device in the neighboring routing domain.

19. An apparatus comprising:
    means for communicating with a neighboring routing domain;
    means for receiving a data packet that is directed to the neighboring routing domain;

means for detecting a failure that prevents communication between the apparatus and the neighboring routing domain;

means for determining if the received data packet was rerouted to the apparatus from another edge device coupled to the neighboring routing domain;

means for rerouting the received data packet to another edge device for forwarding to the neighboring routing domain, if the received data packet was not rerouted to the apparatus from another edge device coupled to the neighboring routing domain; and means for preventing the received data packet from being rerouted a second time to prevent loops, if the received data packet was rerouted to the apparatus from another edge device coupled to the neighboring routing domain.

20. The apparatus of claim 19 wherein the means for determining if the received data packet was rerouted determine if a fast reroute (FRR) identifier value is stored in a field of the received data packet.

\* \* \* \* \*